M. E. SHERMAN.
CAR FOR PERISHABLE GRANULAR MATERIAL.
APPLICATION FILED JAN. 12, 1917.

1,274,614.

Patented Aug. 6, 1918.
3 SHEETS—SHEET 2.

Inventor
Marvin E. Sherman
By Lancaster and Allwine
his Attorneys

M. E. SHERMAN.
CAR FOR PERISHABLE GRANULAR MATERIAL.
APPLICATION FILED JAN. 12, 1917.
1,274,614.
Patented Aug. 6, 1918.
3 SHEETS—SHEET 3.
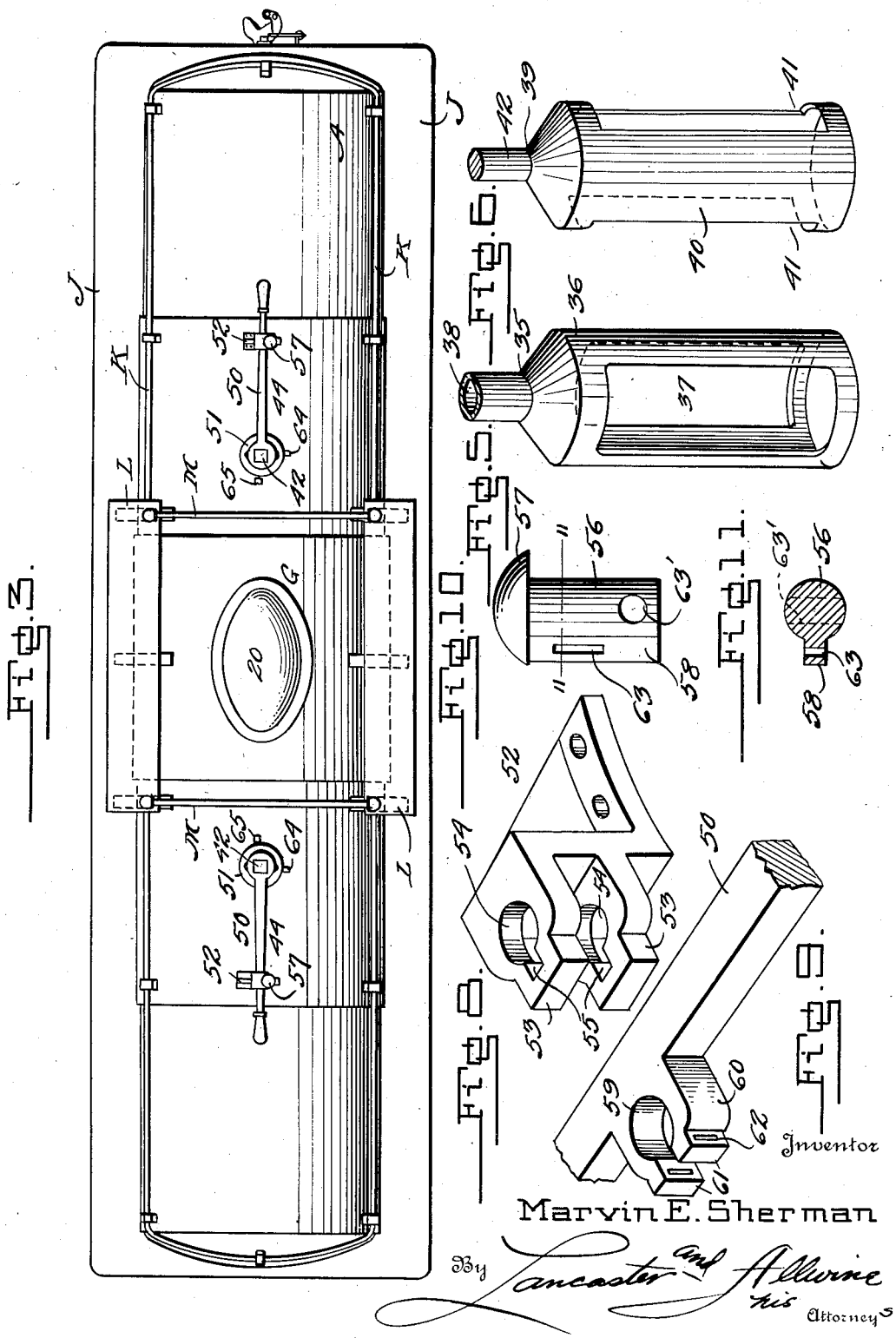

UNITED STATES PATENT OFFICE.

MARVIN E. SHERMAN, OF OKLAHOMA, OKLAHOMA.

CAR FOR PERISHABLE GRANULAR MATERIAL.

1,274,614.  Specification of Letters Patent.  Patented Aug. 6, 1918.

Application filed January 12, 1917. Serial No. 142,011.

*To all whom it may concern:*

Be it known that I, MARVIN E. SHERMAN, a citizen of the United States, and a resident of Oklahoma, in the county of Oklahoma and State of Oklahoma, have invented a certain new and useful Improvement in Cars for Perishable Granular Material, of which the following is a specification.

My present invention relates to cars for the transportation of perishable granular material, such as bulk grain or seeds, which is apt to become musty if exposed to damp atmosphere or subjected to water, and which flows, so to speak, from small openings.

It is now common practice to transport such granular material in what is commonly known as box cars using a special "grain door" which is a close-fitting movable door on the inside of the car by which the lower part of the door opening is closed when the car is loaded and intended to prevent grain from leaking out. Frequently these grain doors give way or spring leaks while being loaded, or when in transit, allowing the grain to escape and thereby causing heavy loss to the shipper and to the conveyer. These box cars, usually constructed of wood, become damaged in transit; the lining when broken permits the grain to press against the outside walls of the cars, which frequently results in such walls giving way and the grain becomes lost. Other losses result from thieves boring holes in the sides or bottoms of the box cars, permitting the grain to flow into containers, the holes being subsequently closed as by wooden plugs, to escape detection; and, leaky roofs permit the grain to become damaged by moisture when subjected to inclement weather for a considerable length of time.

Even box cars in fair condition to exclude rain or snow are at times partially or wholly submerged in water, due to high tides, violent storms, etc., especially when on sidings or at grain elevators waiting to be unloaded, the grain being water-soaked, sour, and either totally unfit for use or requiring the use of grain driers.

One of the principal objects of my invention is therefore to provide cars for the transportation of perishable or vegetable granular material, adapted to exclude moisture from the top, bottom, sides and ends, and resist removal of grain by unauthorized persons.

Other objects of my invention are to provide cars for the use described which may be easily loaded, inspected and sealed when loaded, and easily unloaded by gravity flow of the granular material from the cars in a manner to facilitate the conveying of the matter to other containers, such as grain elevators.

Other objects as well as the nature of the invention may best be understood from a description of a practical embodiment thereof, such as is shown for purposes of illustration in the accompanying drawings, in which:—

Fig. 2 is an enlarged sectional view on the line 2—2 of Fig. 1 looking in the direction of the arrows.

Fig. 3 is a top plan view of the car.

Fig. 4 is an enlarged central vertical sectional view through an improved closure for the ingress opening of the body of the car.

Fig. 5 is a fragmentary perspective view of a valve housing.

Fig. 6 is a similar view of the valve.

Fig. 7 is a transverse sectional view through the valve and its housing.

Fig. 8 is a perspective view of an element of means for preventing unauthorized removal of granular material from the car.

Fig. 9 is a fragmentary perspective view of another element of said means.

Fig. 10 is a side elevation of a still further member of the said means.

Fig. 11 is a sectional view on the line 11—11 of Fig. 10.

Figure 1:
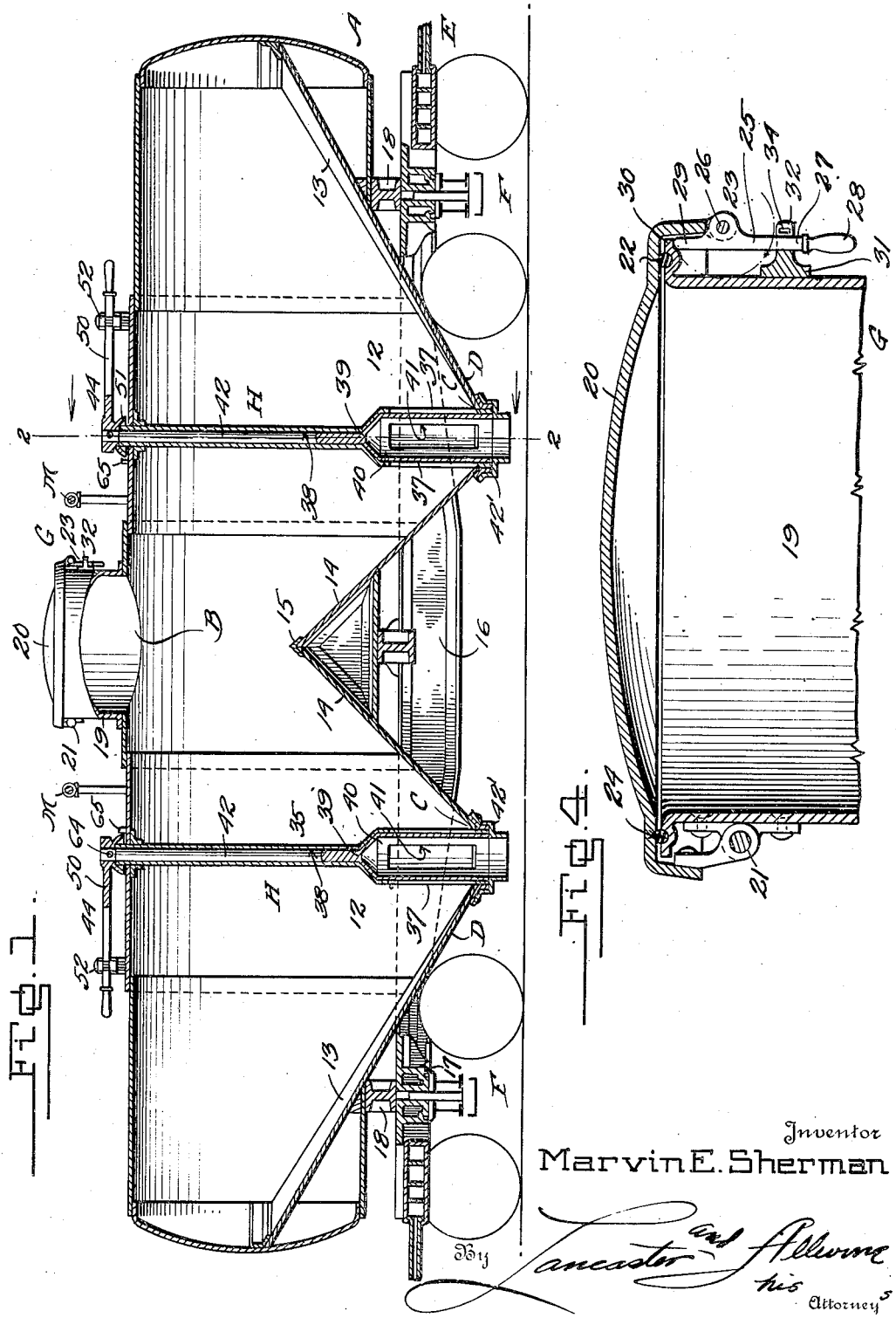
Figure 1 is a central longitudinal vertical sectional view through a car embodying my invention.

In the drawings, where similar characters refer to similar parts throughout the several views, A designates the body of the car, formed to provide an ingress opening B and egress openings C at the bottom of hoppers D thereof, said body being preferably formed of sheet metal; E the underframe which receives the buffing and pulling stresses and carries the body A and appertaining parts, and which may mutually stiffen and strengthen one another; F trucks supporting the underframe E; G a closure for the ingress openings B; and, H control means for the egress openings C. A suitable running board J at the sides and ends of body A, hand rails K thereabove; platforms L to the sides of closure G, and guards M transversely of the body A at the ends of closure G may also be provided, but these form no essential part of the invention.

Referring first to the body A, while it is herein shown resembling somewhat the body of a tank car, it is to be understood that I do not limit myself to such shaped main body although such is well adapted to resist internal pressure and to strengthen and stiffen the car. The ingress opening B is preferably elongated and disposed substantially midway of the ends of the elongated body A, with its major axis longitudinally of body A. An opening of this general shape is well adapted to permit of the passage of a bifurcated loading spout to be inserted into the body of the car and to direct the granular material toward the ends of the car.

In the example shown, two hoppers D are provided, said hoppers being formed from portions 12 of the side walls of the body A and inclined walls 13 and 14 which converge toward the egress opening C. It is preferred to provide the hoppers so that they are relatively longer longitudinally of the body A than transversely thereof and with the adjacent walls 14 of the hoppers converging upwardly and meeting in a line beneath the said ingress opening B, as clearly shown in Fig. 1 of the drawings. A ridge 15 may be provided over the meeting ends of the said portions 14 of the hoppers. Thus, if the car is not loaded utilizing a bifurcated spout, this arrangement of hoppers will tend to distribute the load equally within the body A and facilitates the removal of all of the granular material from the car, by gravity flow, as hereinafter set forth.

As to the underframe E, in the example, it comprises longitudinally extending beams 16 in spaced relation at the sides of the car; bolsters 17 joining the end portions of beams 16; and, cross body-bolsters 18 surmounted upon, or otherwise supported from the beams 16, one of said bolsters 18 being at each end portion of the underframe and one, in the example shown, substantially midway of the ends of said beams as is clearly shown in Fig. 1 of the drawings. The trucks F may be of any suitable type operatively connected with bolsters 17, in any well-known manner.

The body A may rest directly upon the body bolsters 18, the latter, in the example shown, acting as saddles for the curved under portions of the body A, the hoppers D being accommodated between the beams 16 and bolsters 18 in a manner that the egress opening C will be in close proximity to the ground, yet the upper portion of the hopper will be above and remote from the underframe.

Referring now to the closure G for the ingress opening B, it comprises a dome 19 disposed about said opening B in a watertight manner; a lid 20 for said dome, in the example shown hingedly connected therewith as at 21; a packing 22 between the dome 19 and lid 20; and, latch and lock mechanisms 23 for holding the lid 20 in a closed position with respect to dome 19. The packing 22 may be received in a groove 24 provided in the upper portion of dome 19 in a manner to engage the underface of cover 20 with intimate contact. The mechanisms 23 may comprise a lever 25 pivotally carried by lid 20 as at 26, the arm 27 of lever 25 provided with a handle 28 to facilitate manipulation, and the arm 29 of said lever adapted to engage the underside of a flange 30 or other projection of the dome 19; and, a retaining block 31 secured to dome 19 provided with spaced extensions 32 provided with slots 34, to receive a lock or seal, not shown in the drawing, when the arm 27 of lever 25 is swung so as to lie between the extensions 32 as is clearly shown in Fig. 4 of the drawings.

The control means H for the egress opening C comprises a valve housing 35 disposed in an upright position in body A about the egress opening C and is preferably enlarged as at 36, adjacent said opening where it is provided with lateral slots 37, an upright way 38 leading from the enlargement 36 and open at the exterior of the body A; a valve 39 in housing 35 and including a hollow body 40 fitting within the enlargement 36 and provided with lateral slots 41 adapted to be opened to the said slots 37 of housing 35, or to be concealed in the latter, and a stem 42 extending from body 40, through the said way 38 of housing 35 to the exterior of the car; a member 42', such as a spout providing an annular seat 43, said spout being at the bottom of the hopper D and the valve 39 resting upon the said seat 43; and, means 44 for manipulating valve 39 and retaining the same in closed position against unauthorized use. The enlargement 36 of housing 35 may be secured in water-tight engagement with the hoppers D at egress openings C, in any suitable manner, and it is preferred to dispose said housing with its slots 37 facing the longer portion of the hopper. A collar 45 may be placed about the upper portion of housing 35 at the interior of the top of body A to prevent water from leaking in. The spout may be detachably secured to the hopper D as by means 46 which can only be released from the interior of the car, said means in the example shown comprising bolts 47 extending through a flaring flange 48 of the spout, said bolts disposed with their heads at the exterior of the car; and, nuts 49 turned about the bolts at the interior of the hopper, as is clearly shown in Fig. 2 of the drawings. If it is desired to remove the valve 39, this may be accomplished by first releasing the means 49, whereupon the spout may be taken off, and the valve 39, if otherwise free, may be withdrawn from operative relation to its housing 35, by downward movement. It is to be understood that while the valve 39 may be oscillated, it is in intimate contact with its housing and its seat 43 of spout 42' so as to exclude water from the interior of the body A, when the slots 37 and 41 are out of communication, so as to prevent the ingress of water even though the car should be partially or wholly submerged. The slots 37 and 41 should be of such a size as to permit the grain to "flow" freely from the body A when said slots are open one to another, due to the force of gravity. The means 44 may comprise a lever 50 operatively connected with the upper outer end portion of stem 42, said lever provided with an inverted cup-like member 51 extending over and about the upper end portion of housing 35; a block 52 rigidly secured to the top of body A and provided with horizontally disposed parallel spaced extensions 53 provided with alined perforations 54 having keyways 55; and, a pin 56 provided with a head 57 and laterally extending key 58, said pin to extend through the perforations 54 with its key 58 accommodated in the said keyways 55, the pin also extending through a way 59 provided by lateral extensions 60 on lever 50, said extensions having facing offsets 61 provided with alined slots 62, the said key 58 to lie between the offsets 61 and provided with a slot 63 adapted to open to the said slots 62. Thus when the pin 56 is in operative relation to the block 52 and lever 60, the said lever cannot be swung about its axis, and a seal, not shown in the drawings, may be trained through the slots 62 and 63 for the well-known purpose of sealing the car. The pin 56 may be provided with a transverse way 63' at its lower end portion to receive the shackle of a lock, not shown in the drawings. In order to limit the amplitude of oscillation of the lever 50, the member 51 may be provided with a lateral projection 64 adapted to engage a lug 65 rigid with body A, when the valve 39 is disposed within slots 41 open wholly to slots 37, the said levers 50 extending longitudinally of the body A when the valves are in a closed position.

If the body A is cylindrical in general outline the running board J and hand-rail K will enable trainmen to pass from one end of the car to the other and provide a support for the operator of control means H. The platforms L provide supports for those arranging or removing the inlet spout, grain inspectors and those looking after the proper closure of the ingress opening B.

In operation, it is understood that the granular material may be placed in the body A, in any suitable manner and may be forced to the remote end portions of the car by air, if desired. If the angle between the portions 14 of hoppers D is greater than the angle between the portions 13 of said hoppers and the horizontal, the tendency will be to cause the grain to move toward the end portions of the car, so that it may be loaded to its fullest capacity, if desired.

The car may be quickly unloaded by manipulation of the valves 39, as is obvious from an inspection of the drawings, the spout 42 being positioned so as to facilitate conveying of the grain in any suitable manner to the grain elevators.

I wish to lay particular stress upon the fact that a car of the character described is particularly adapted for the transportation of perishable or vegetable granular material, since it may be readily rendered water-tight but will permit of ready flow of the grain from the car when it is desired to unload the same. Should foreign matter find its way between the valve 39 and housing 35, the said valve may be readily removed although it is desirable to rigidly secure the lever 50 to the head of stem 42', as by a rivet 64' to guard against unauthorized manipulation of the valve.

Changes in details may be made without departing from the spirit or scope of my invention; but,

I claim:—

1. In a car for perishable granular material, the combination of a water-tight body provided with a hopper at its bottom, said hopper provided with an egress opening at its lower end, an upright valve housing about said opening, provided with lateral slots and an upright way open to, the exterior of said body, and a valve in said housing including a hollow body provided with slots adapted to be opened to said slots of said housing or to be concealed in the latter, and a stem extending from said valve body through the said way of said housing exteriorly of said body to facilitate operation of said valve from the exterior of the car.

2. In a car for perishable granular material, the combination of a water-tight body provided with a hopper at its bottom, said hopper provided with an egress opening at its lower end, a valve housing about said opening provided with lateral slots, a valve in said housing including a hollow body open at its bottom and provided with lateral slots adapted to be opened to the said slots of said housing or to be concealed in the latter, and a stem extending from said valve body upwardly through said body to facilitate operation of said valve from the exterior of the car, and a removable member at the bottom of said hopper providing an annular seat upon which the said valve rests.

3. In a car for perishable granular material, the combination of a water-tight body provided with a hopper at its bottom, said hopper provided with an egress opening at its lower end, a valve housing about said opening provided with lateral slots, a valve in said housing including a hollow body open at its bottom and provided with lateral slots adapted to be opened to the said slots of said housing or to be concealed, in the latter, and a stem extending from said valve body upwardly through said body to facilitate operation of said valve from the exterior of the car, and a removable spout at the bottom of said hopper providing an annular seat upon which the said valve rests.

4. In a car for perishable granular material, the combination of a water-tight body provided with a hopper at its bottom, said hopper provided with an egress opening at its lower end, an upright valve housing about said opening, provided with lateral slots and an upright way open at the exterior of said body, a valve in said housing including a hollow body provided with slots adapted to be opened to said slots of said housing or to be concealed in the latter and a stem extending from said valve body through the said way of said housing to the exterior of said body, to facilitate operation of said valve from the exterior of the car, and a removable member at the bottom of said hopper provided with an annular seat upon which the said valve rests.

5. In a car for perishable granular material, the combination of a water-tight body provided with a hopper at its bottom, said hopper provided with an egress opening at its lower end, an upright valve housing about said opening, provided with lateral slots and an upright way open at the exterior of said body, a valve in said housing including a hollow body provided with slots adapted to be opened to said slots of said housing or to be concealed in the latter and a stem extending from said valve body through the said way of said housing to the exterior of said body, to facilitate operation of said valve from the exterior of the car, and a removable spout at the bottom of said hopper providing an annular seat upon which the said valve rests.

6. In a car for perishable granular material, the combination of a water-tight body provided with a hopper at its bottom, said hopper provided with an egress opening at its lower end, a valve housing about said opening provided with lateral slots, a valve in said housing including a hollow body open at its bottom and provided with lateral slots adapted to be opened to said slots of said housing or to be concealed in the latter and a stem extending from said valve body upwardly through said car body to facilitate operation of said valve from the exterior of the car, a member at the bottom of said hopper provided with an annular seat upon which said valve rests, and means for detachably securing said last-mentioned member to said body, said means releasable only from the inside of the car body.

7. In a car for perishable granular material, the combination of a water-tight body provided with a hopper at its bottom, said hopper provided with an egress opening at its lower end, a valve housing about said opening provided with lateral slots, a valve in said housing including a hollow body open at its bottom and provided with lateral slots adapted to be opened to said slots of said housing or to be concealed in the latter and a stem extending from said valve body upwardly through said car body to facilitate operation of said valve from the exterior of said car, a spout at the bottom of said hopper providing an annular valve seat upon which said valve rests, and means for detachably securing the said spout to the said body, said means releasable only from the inside of the body.

8. In a car for perishable granular material, the combination of a water-tight body provided with a hopper at its bottom, said hopper provided with an egress opening at its lower end, an upright valve housing about said opening provided with lateral slots and an upright way open to the exterior of said car body, a valve in said housing including a hollow body provided with slots adapted to be opened to the said slots of said housing or to be concealed in the latter and a stem extending from said valve body through the said way of said housing to the exterior of the car body to facilitate operation of said valve from the exterior of the car, a member at the bottom of said hopper providing an annular seat upon which the said valve rests, and means for detachably securing said last-mentioned member to said body, said means releasable only from the interior of the car body.

9. In a car for perishable granular material, the combination of a water-tight body provided with a hopper at its bottom and said hopper provided with an egress opening at its lower end, an upright valve housing about said opening provided with lateral slots and an upright way open to the exterior of said car body, a valve in said housing including a hollow body formed with slots adapted to be opened to said slots of said housing or to be concealed in the latter, and a stem extending from said valve body through the said way of said housing to the exterior of said car body to facilitate operation of said valve from the exterior of the car, a spout at the bottom of said hopper providing an annular seat upon which the said valve rests, and means for detachably securing said spout to said body, said means releasable only from the interior of said car body.

10. In a car for perishable granular material, the combination of a water-tight body provided with a hopper at its bottom, said hopper provided with an egress opening at its lower end and relatively longer longitudinally of the body than transversely thereof, an upright valve housing about said opening provided with lateral slots open to the longer portions of said hopper and an upright way open to the exterior of said body, and a valve in said housing including a hollow body provided with slots adapted to be opened to the said slots of said housing or to be concealed in the latter, and a stem extending from said valve body through the said way of said housing exteriorly of said body to facilitate operation of said valve from the exterior of said car.

11. In a car for perishable granular material, the combination of a water-tight body provided with a hopper at its bottom, said hopper provided with an egress opening at its lower end, an upright valve housing in water-tight engagement with the said hopper about said opening and extending through the top of said body in water-tight engagement therewith, said housing provided with lateral slots and a longitudinally extending way open to the exterior of said body at the top thereof, and a valve in said housing including a hollow body provided with slots adapted to be opened to the said slots of said housing or to be concealed in the latter, and a stem extending from the said valve body through the said way of said housing to the exterior of said car body to facilitate operation of said valve from the exterior of the car.

12. In a car for perishable granular material, the combination of a water-tight body provided with a hopper at its bottom, said hopper provided with an egress opening at its lower end, an upright valve housing in water-tight engagement with the said hopper about said opening and extending through the top of said body in water-tight engagement therewith, said housing provided with lateral slots and a longitudinally extending way open to the exterior of said body at the top thereof, a valve in said housing including a hollow body provided with slots adapted to be opened to the said slots of said housing or to be concealed in the latter, and a stem extending from the said valve body through the said way of said housing to the exterior of said car body to facilitate operation of said valve from the exterior of the car, and a removable member at the bottom of said hopper providing an annular seat upon which the said valve rests.

13. In a car for perishable granular material, the combination of a water-tight body provided with a hopper at its bottom, said hopper provided with an egress opening at its lower end, an upright valve housing in water-tight engagement with the said hopper about said opening and extending through the top of said body in water-tight engagement therewith, said housing provided with lateral slots and a longitudinally extending way open to the exterior of said body at the top thereof, a valve in said housing including a hollow body provided with slots adapted to be opened to the said slots of said housing or to be concealed in the latter, and a stem extending from the said valve body through the said way of said housing to the exterior of said car body to facilitate operation of said valve from the exterior of the car, and a lever provided with an inverted-cup-like portion disposed over the upper end portion of said housing, said lever secured to the said stem of said valve.

14. In a car for perishable granular material, the combination of a water-tight body provided with a hopper at its bottom, said hopper provided with an egress opening at its lower end, an upright valve housing in water-tight engagement with the said hopper about said opening and extending through the top of said body in water-tight engagement therewith, said housing provided with lateral slots and a longitudinally extending way open to the exterior of said body at the top thereof, a valve in said housing including a hollow body provided with slots adapted to be opened to the said slots of said housing or to be concealed in the latter, and a stem extending from the said valve body through the said way of said housing to the exterior of said car body to facilitate operation of said valve from the exterior of the car, a lever provided with an inverted-cup-like portion disposed over the upper end portion of said housing, said lever secured to the said stem of said valve, and means for locking said lever in a position with the said slots of said valve and housing out of communication.

15. In a car for perishable granular material, the combination of an elongated closed body provided with an ingress opening substantially midway of its ends and formed with hoppers at its bottoms and egress openings at the lower portions of said hoppers, the adjacent walls of said hoppers converging upwardly and meeting in a line beneath the said ingress opening, and means for controlling said egress openings.

16. In a car for perishable granular material, the combination of an elongated closed body provided with an elongated ingress opening substantially midway of the ends of said body and with its major axis longitudinally of the same, said body formed near opposite ends with hoppers at its bottom and egress openings at the lower portions of said hoppers, the adjacent walls of said hoppers converging upwardly and meeting in a line beneath the said ingress opening, and means for controlling said egress openings.

MARVIN E. SHERMAN.